UNITED STATES PATENT OFFICE.

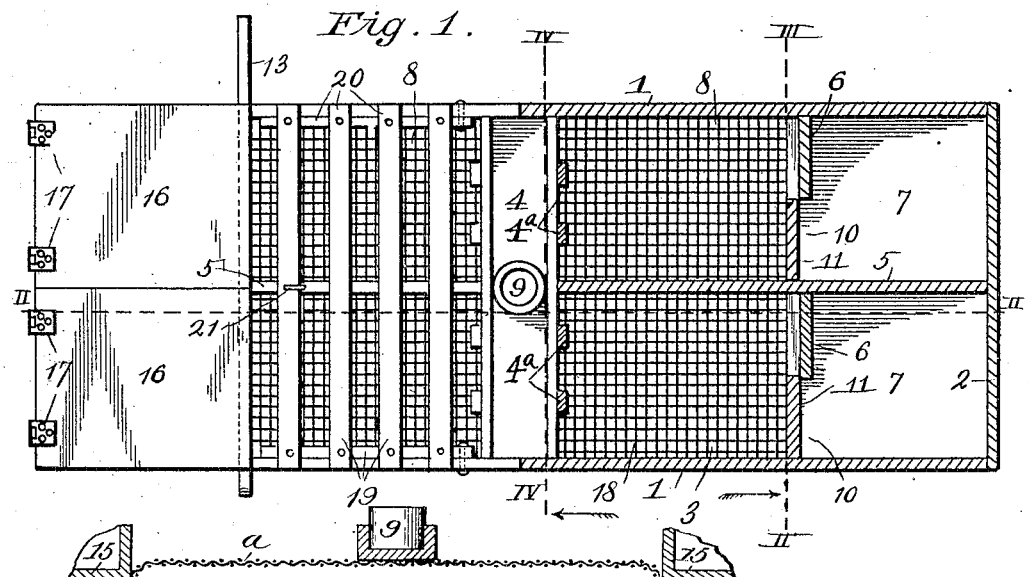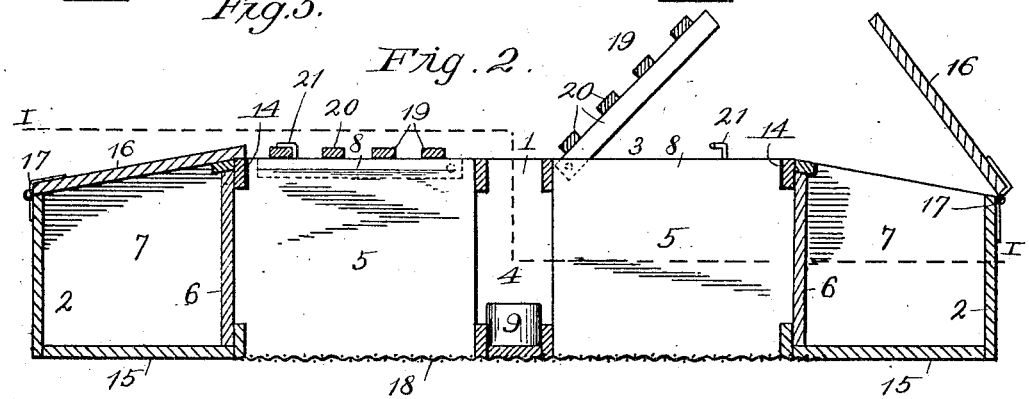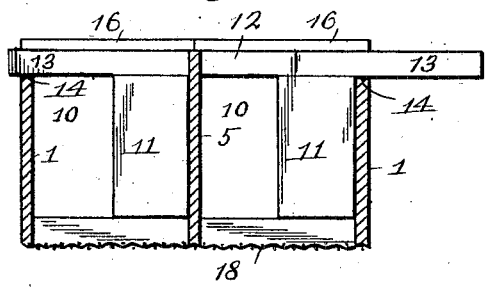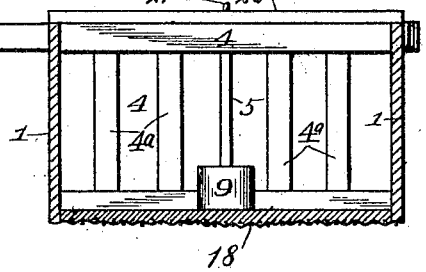

PEARLEY J. SPRAGUE, OF GASHLAND, MISSOURI.

HATCHER.

No. 849,433.

Specification of Letters Patent.

Patented April 9, 1907.

Application filed April 14, 1906. Serial No. 311,637.

*To all whom it may concern:*

Be it known that I, PEARLEY J. SPRAGUE, a citizen of the United States, residing at Gashland, in the county of Clay and State of Missouri, have invented certain new and useful Improvements in Hatchers, of which the following is a specification.

My invention relates to improvements in hatchers; and one of my objects is to provide a cheap and efficient appliance for sheltering and protecting setting hens or other fowl against being disturbed by surrounding adverse conditions during the period of incubation.

A further object is to reduce to a minimum the time and labor occupied in providing hens with food and drink. I accomplish this result by locating the feed-trough and water-receptacle in the center of the hatcher, so that all of the hens may have access thereto without leaving their respective compartments.

Referring now to the accompanying drawings, which illustrate the invention, Figure 1 represents an irregular sectional plan view of the hatcher, taken on line I I of Fig. 2. Fig. 2 is a longitudinal section taken on line II II of Fig. 1. Figs. 3 and 4 are transverse sections taken on lines III III and IV IV, respectively, of Fig. 1. Fig. 5 shows a modified form of bottom for the hatcher.

In practice I construct the outer portion of the hatcher of side walls 1 and end walls 2, forming a main compartment 3, which is divided at its central portion by a continuous transverse feed-trough 4 into two smaller compartments. Feed-trough 4 extends from wall to wall of the main compartment, and its sides consist of slats 4ª, spaced equal distances apart to allow the hens to pass their heads and necks through said spaces and gain access to the trough. Said smaller compartments are divided by two centrally-disposed longitudinal partitions 5, extending from the sides of the trough to the end walls 2, as shown in Fig. 2. The four compartments thus formed by said partitions are divided by transverse partitions 6 into two series of small compartments or nests 7 and feed-yards 8. All of said feed-yards communicate with the feed-trough and a water-receptacle 9, centrally located therein, so that the hens or other fowl within the yards may gain access to the food and water without entering said trough. By thus centralizing the feed-trough and water-receptacle the same may be replenished at a small expenditure of time or labor, as the four hens within the hatcher may be taken care of in the same time that it ordinarily requires for one. By preventing the hens from entering the trough one cannot molest the other, and each may obtain its proportion of food and drink. A saving in feed is also effected by excluding the hens from the trough.

Partitions 6 have openings or doorways 10, so that the hens may pass freely from the nests into the yards when the doors 11 are drawn to one side to uncover said openings.

The doors of each series of nests are secured to a connecting-bar 12, so that they may be simultaneously opened or closed by moving said bar longitudinally. Said connecting-bars extend outwardly beyond walls 1 to form handles 13 and are arranged in notches 14 in the upper ends of walls 1 and partitions 5, so that they and the doors may be removed when desired by lifting them upwardly. Nests 7, wherein the eggs to be subjected to the incubating process are placed, are closed at their bottom portions by flooring 15 and at their upper portions by lids 16, secured to walls 2 by hinges 17, so that access may be had to said nests. The end portions of walls 1 and partitions 5 slope in opposite directions, as shown in Fig. 2, so that when lids 16 are closed they will effectually shed rain, and thus prevent it entering the nests.

The bottom portions of the yards are closed by wire-cloth 18 in order to exclude rodents, and the upper portions are closed by covers 19, pivotally secured to the side walls, so that they may be lifted to the position shown in Fig. 2 when it is desired to gain access to the yards. Said covers consist of slats 20 to admit air and light and are normally locked in closed position by hooks 21, swiveled in the upper portions of partitions 5.

Wire-cloth 18 may rest directly upon the ground, as shown in Fig. 2, or, if desired, the lower edges of walls 1 may be arched, as shown in Fig. 5, and the wire tacked thereto in order to leave a space of several inches between said wire and the surface of the ground. This latter arrangement insures cleanliness of the yards, as all soil will pass through the interstices of the cloth to the ground.

Having thus described my invention, what I claim, and desire to secure by Letters Patent, is—

In an appliance of the character described, a compartment, a longitudinal partition dividing the same into two smaller compartments, transverse partitions having doorways and dividing said smaller compartments into feed-yards and nests, removable doors arranged to move laterally to cover or uncover the doorways, and a connecting-bar secured to said doors and provided with integral handles, substantially as described.

In testimony whereof I affix my signature in the presence of two witnesses.

PEARLEY J. SPRAGUE.

Witnesses:
R. A. THOMPSON,
OREN I. MOORE.